US012623473B2

(12) United States Patent
Onecha Celestino et al.

(10) Patent No.: US 12,623,473 B2
(45) Date of Patent: May 12, 2026

(54) MOVABLE ARMS FOR PRINTER INPUT TRAYS

(71) Applicant: Hewlett-Packard Development Company, L.P., Spring, TX (US)

(72) Inventors: Javier Onecha Celestino, Sant Cugat del Valles (ES); Ricardo Sanchis Estruch, Sant Cugat del Valles (ES); Eduardo Martin Orue, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 142 days.

(21) Appl. No.: 18/578,920

(22) PCT Filed: Jul. 14, 2021

(86) PCT No.: PCT/US2021/041647
§ 371 (c)(1),
(2) Date: Jan. 12, 2024

(87) PCT Pub. No.: WO2023/287411
PCT Pub. Date: Jan. 19, 2023

(65) Prior Publication Data

US 2024/0336076 A1 Oct. 10, 2024

(51) Int. Cl.
*B41J 13/10* (2006.01)
*B65H 1/04* (2006.01)

(52) U.S. Cl.
CPC .............. *B41J 13/103* (2013.01); *B65H 1/04* (2013.01); *B65H 2405/11425* (2013.01); *B65H 2405/1144* (2013.01); *B65H 2511/12* (2013.01); *B65H 2511/22* (2013.01)

(58) Field of Classification Search
CPC ............. B65H 33/08; B65H 1/04; B41J 13/10
USPC ........................................................... 347/19
See application file for complete search history.

(56) References Cited

U.S. PATENT DOCUMENTS

| | | | | |
|---|---|---|---|---|
| 4,657,239 A * | 4/1987 | Ikesue | B65H 9/101 271/227 |
| 5,927,702 A | 7/1999 | Ishii et al. | |
| 8,474,812 B1 | 7/2013 | Blair et al. | |
| 8,636,277 B1 | 1/2014 | Blair et al. | |
| 2015/0367659 A1* | 12/2015 | Katerberg | B41J 2/2135 347/16 |
| 2017/0320701 A1 | 11/2017 | Hale et al. | |
| 2020/0307275 A1 | 10/2020 | Yonemitsu | |
| 2020/0361740 A1* | 11/2020 | Campbell | B65H 23/035 |

* cited by examiner

*Primary Examiner* — Laura Martin
(74) *Attorney, Agent, or Firm* — Jordan IP Law, LLC

(57) ABSTRACT

Examples include a device for offsetting printing media in a printer input tray. The device comprises a support, a movable arm extended along the media advance direction, a spring for generating a spring force urging the movable arm against the support, and a releasable actuator for compensating the spring force and for selectively offsetting the movable arm away from the support in a plane parallel to a base of the input tray. The movable arm is maintained parallel to the media advance direction during movement of the movable arm.

15 Claims, 6 Drawing Sheets

MOVABLE ARMS FOR PRINTER INPUT TRAYS

BACKGROUND

This disclosure generally relates to the handling of printing media which are widely used as support to share information in a written or graphical form. In order to obtain satisfactory printing quality, printing media should be precisely located in an input tray of a printer.

DETAILED DESCRIPTION

In order to get printed on, printing media follows a printing media path along a media advance direction in a printer, such printing media path starting in a printer input tray. The correct positioning of printing media in the input tray permits engaging the printing media correctly on the media path towards a print zone of the printer. In some cases, the printing media takes a generally rectangular shape and comprises a leading edge, a trailing edge and sides, the sides being, during printing, substantially aligned with the media advance direction, the leading edge and trailing edge being, during printing, substantially perpendicular to the media advance direction, the printing media having a substantially constant thickness in a direction perpendicular to the sides and to the leading and trailing edges. In this disclosure, the use of the word substantially should be understood as within plus or minus one degree of the direction concerned. Positioning of such a generally rectangular shaped printing media in the input tray can involve guiding one or both sides of the printing media using one or more guides. Such guides permit aligning the printing media sides with the direction of the media advance direction, such that a graphical representation may be printed as expected on the printing media. Appropriate guiding however relies on the assumption that the sides of the printing media are straight. In cases where the sides of the printing media are not straight, the printing media may get displaced, or skewed, by the guides, as the printing media advances along the media advance direction. While such displacement or skew may take marginal values, such displacement or skew may introduce printing imperfections sometimes called "zebra effect". Avoiding or reducing the occurrence of such printing imperfections forms the foundation of the present disclosure.

As will be described in the following examples, a combination of a movable arm, of a spring and of a releasable actuator is disclosed which permits on one hand placing a printing medium on a base of an input tray, and on the other hand releasing the movable arm once the printing medium is placed. While the placement of the printing medium on the base of the input tray permits guiding of the printing medium towards a printing zone along a media advance direction, the releasing of the movable arm once the printing medium has been placed permits maintaining the printing medium in a same orientation as the printing medium moves along the input tray along the media advance direction, even in case of a printing medium having uneven sides. In order to avoid misplacement of printing media regardless of the positioning of the movable arm, the movable arm is maintained parallel to the media advance direction during movement of the movable arm. The combined action of the spring and of the release permits a rapid and reliable operation.

Figure 1A:
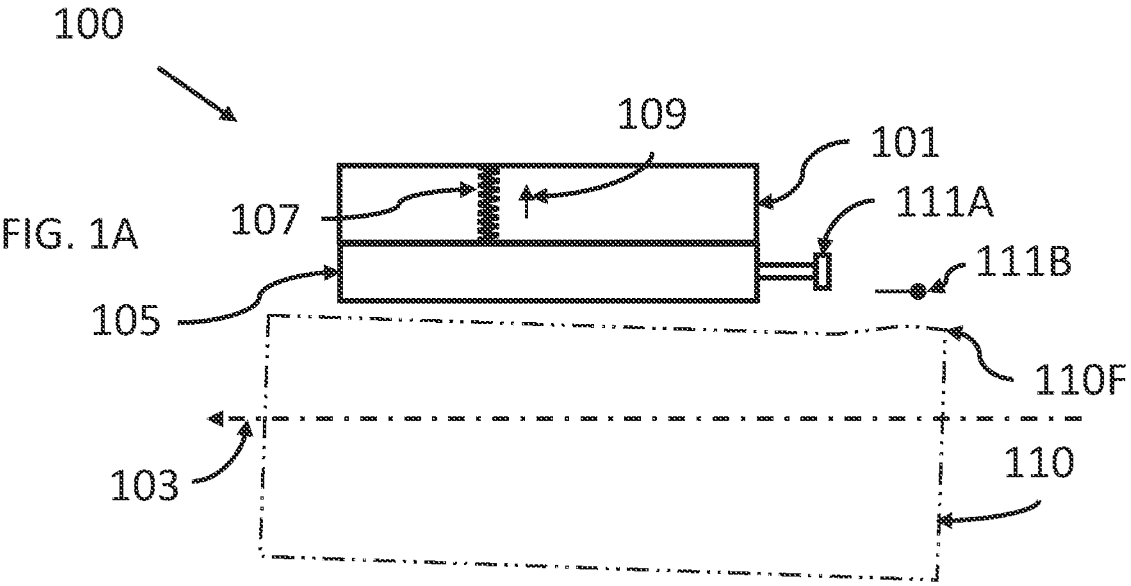
FIGS. 1A-C illustrate an example device for offsetting printing media in a printer input tray.
Figure 1B:
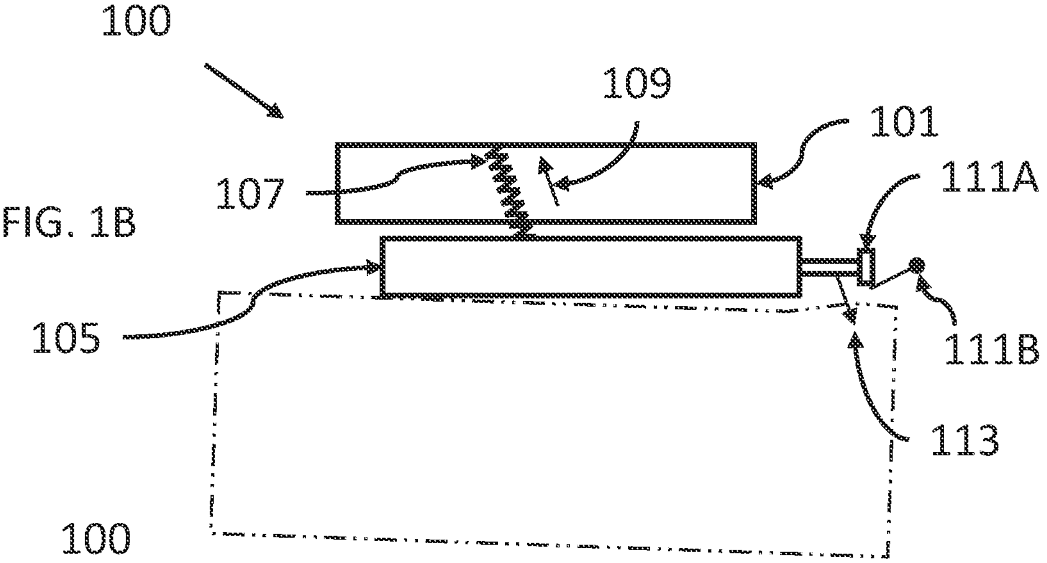
Figure 1C:
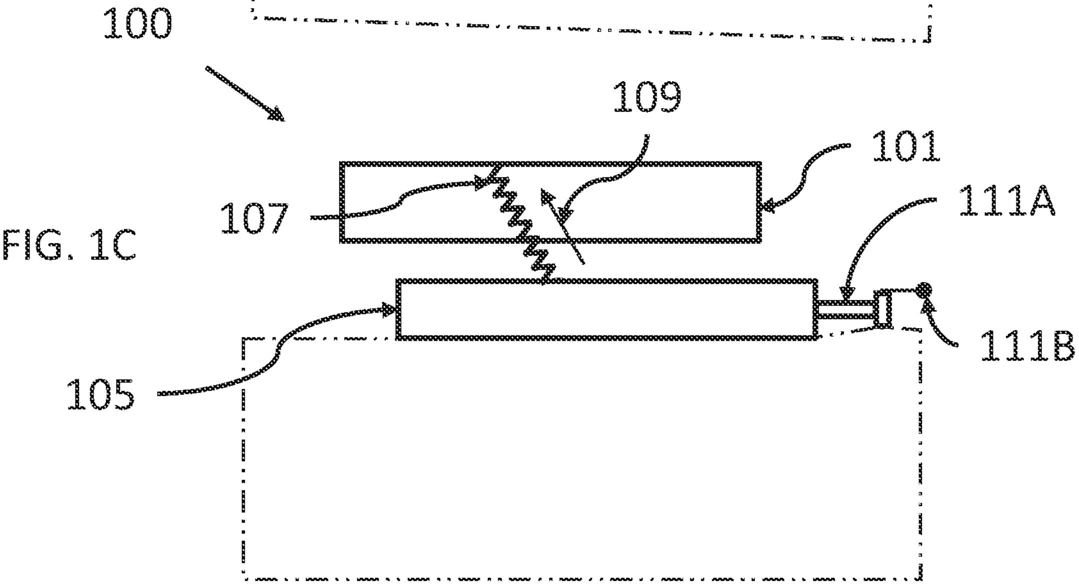

FIGS. 1A-C illustrate an example device 100 for offsetting printing media 110 in a printer input tray. Printing media should be understood as a sheet like or planar shaped material to receive a printing fluid in order to print a graphical representation. The sheet may be rigid or may be flexible. In some examples, the printing media has a thickness of about 0.1 mm. In some examples, the printing media has a thickness of up to 10 mm. In some examples, the printing media takes a cut sheet format such as one of ANSI (American National Standards Institute) A (229 mm×305 mm), B (305 mm×457 mm). C (457 mm×610 mm), D (610 mm×914 mm) or E (914 mm×1219 mm) cut sheets. Other example format comprise ISO formats, in particular International Standard Organization, ISO, 216 paper sizes A, B or C. DIN (German Institute for Standardization) paper sizes A0 to A10, or Japanese Industrial Standard, JIS paper sizes. In some example, the printing media comprise cellulose based fibers. A printing media may be made of paper, carboard, wood or foamboard for example. A printing media may be a laminate. A printing media may be a textile sheet of media. A printer input tray should be understood as a mechanical part on which printing media may be placed prior to being printed. A printer input tray comprises a base onto which the printing media may lie. Offsetting printing media in a printer input tray should be understood as exerting a mechanical action onto the printing media located in the printer input tray in order to place the printing media in a desired position. Such offsetting takes place in a plane substantially parallel to a plane corresponding to the base of the input tray. Depending on an original placement of the printing media, the offsetting may comprise a translation, a rotation, or a combination of a translation and of a rotation, the printing media remaining located in the plane corresponding to the base of the input tray.

Example device 100 comprises a support 101. A support should be understood as a mechanical element which is stationary in relation to the base of the input tray. In some examples, the support is an integral part of the input tray. In some examples, the support is a part separate from the input tray and is fixedly attached to the input tray, permitting for example the upgrading of existing input trays. In some examples, the support is elongated along a media advance direction 103. In some examples, the support is located on a side of the input tray, a side being defined in reference to the media advance direction.

Example device 100 comprises a movable arm 105 extended along the media advance direction 103. The arm is movable in that it is movable in relation to the support 101. In some examples, the arm comprises a flat and smooth guiding surface parallel to the media advance direction and substantially perpendicular to a base of the input tray, such flat and smooth guiding surface acting as a guide for a side of printing media. The movable arm is extended along the media advance direction in order to guide printing media along this media advance direction. In some examples, the movable arm has a length along the media advance direction of more than 5 cm, more than 10 cm, more than 15 cm or more than 20 cm. A longer length helps in this respect placement of the printing media in the direction of the media advance direction. In some examples, the movable arm comprises a printing media guiding surface parallel to the media advance direction and having a length along the media advance direction of more than 5 cm, more than 10 cm, more than 15 cm or more than 20 cm. In some examples, the movable arm has a height along a direction normal to the base of the input tray of more than 5 mm, more than 10 mm, more than 15 mm or more than 20 mm. A higher height helps in this respect handling relatively thicker printing media or piles of printing media. In some examples, the movable arm comprises a printing media guiding surface parallel to the media advance direction and having a height along a direction normal to the base of the input tray of more than 5 mm, more than 10 mm, more than 15 mm or more than 20 mm. In some examples, the movable arm has a width along a direction parallel to the base of the input tray and perpendicular to the media advance direction of less than 5 mm, less than 10 mm, less than 15 mm or less than 20 mm. A reduction in width reduces a space occupied by the movable arm in the input tray. In some examples, the support is a part separate from the input tray, is fixedly attached to the input tray, and has dimensions similar to the dimensions of the movable arm, and takes an orientation in line with the orientation of the movable arm.

Example device 100 comprises a spring 107 for generating a spring force 109 urging the movable arm against the support. A spring should be understood in this description as a mechanical element which may elastically store mechanical energy. Example springs comprise tension or extension springs, compression springs or torsion springs. In some examples, the spring has a spring rate of more than 1 N/mm, of more than 1.5 N/mm, of more than 2 N/mm or of more than 2.4 N/mm. A relatively larger spring rate increases the spring force urging the movable arm against the support and thereby decreases a risk of vibration or a lack of precision. The spring has a function of rapidly and firmly returning the movable arm to a position as illustrated in FIG. 1A, specifically a position in which the movable arm may be in direct contact with the support, or with a transition piece or spacer between the movable arm and the support. In some examples, a plurality of springs is provided for generating the spring force urging the movable arm against the support, the plurality of springs reproducing in some examples a combined spring rate of more than 1 N/mm, of more than 1.5 N/mm, of more than 2 N/mm or of more than 2.4 N/mm.

Example device 100 comprises a releasable actuator 111A-B for compensating the spring force 109 and for selectively offsetting the movable arm away from the support in a plane parallel to a base of the input tray. Such a releasable actuator should be understood as a mechanism transmitting or generating a mechanical force for compensating the spring force. Numerous different such mechanisms may be provided including for example hand operated releasable actuators, pneumatic releasable actuators or electric releasable actuators. The actuator is releasable in that a counterforce generated or transmitted by the actuator may discontinuously be released, thereby suddenly letting the spring force take over and letting the movable arm return to a position against the support. In the example of FIGS. 1A-C, the releasable actuator comprises a first part 111A such as a handle which may be pulled by a human operator, and a release mechanism 111B which may in this case either sustain the handle in a position whereby the releasable actuator is compensating the spring force, as illustrated for example in FIG. 1C, or may release the releasable actuator as illustrated in FIG. 1A. FIG. 1B illustrates an example intermediate position in which the release mechanism is not engaged (i.e. does not sustain the handle), and whereby the handle is transmitting a human force 113 applied onto the handle to compensate the spring force. Using a releasable actuator permitting an instant release of the movable arm back against the support by application of the spring force permits gaining significant time during use of the device, and avoids or reduces risks of introducing skew as the printing media starts moving along the media advance direction.

In order to illustrate how skew may be reduced or avoided, example printing media 110 is represented with a side default 110F whereby the printing media 110 has an uneven side resulting in a portion 110F sticking out of line on a side. The proportions of the fault are illustrated on a large scale for the purposes of the illustration. Such faults may in some cases be of the order of more than 10 μm, of more than 20 μm, or of more than 50 μm. As illustrated in FIG. 1A, the printing media 110 may be located on the input tray without being aligned with the media advance direction 103, the movable arm 105 being urged against the support by spring force without compensation by the releasable actuator (which is in a released position). As illustrated in FIG. 1B, the movable arm 105 may be moved to be brought in contact with the side of the printing media 110, progressively rectifying the position of the printing media 110 in line with the media advance direction 103 as illustrated in FIG. 1C. Once positioned as in FIG. 1C, the movable arm may be released back to the position illustrated in FIG. 1A. This release moves the movable arm out of the way of default 110F, thereby avoiding that the printing media get skewed while advancing along the media advance direction.

As illustrated in FIGS. 1A-B, the movable arm is maintained parallel to the media advance direction during movement of the movable arm in order to progressively place the printing media in a direction aligned in the printing media direction. In some examples the movable arm is maintained parallel to the media advance direction within less than 1 degree, within less than 0.5 degrees, within less than 0.25 degrees, within less than 0.1 degrees, or within less than 0.01 degrees. In some examples, the movable arm and the support are machined parts, in particular CNC (computer numerical control) machined parts, and the movable arm is maintained parallel to the media advance direction within less than 0.01 degree. Maintaining the movable arm parallel to the media advance direction may be done in a number of different ways as illustrated in the present disclosure. Maintaining the movable arm parallel to the media advance direction may for example be achieved by one or more of wedges matching each other, alignment pins, interlocking ridges and groves, and linking arms.

FIGS. 2A-D illustrate another example device 200 for offsetting printing media in a printer input tray, comprising:

- a support 201;
- a movable arm 205 extended along a media advance direction 203;
- a spring 207A-B for generating a spring force 209A-B urging the movable arm 205 against the support 201; and
- a releasable actuator 211 for compensating the spring force and for selectively offsetting the movable arm 205 away from the support 201 in a plane parallel to a base of the input tray, whereby the movable arm 205 is maintained parallel to the media advance direction 203 during movement of the movable arm 205.

In the example device 200, the support 201 comprises a first 231 and a second 232 support wedge and the movable arm 205 comprises a first 221 and a second 222 movable arm wedge, whereby the wedges 221, 222, 231 and 232 are comprised in planes substantially perpendicular to the base of the input tray and inclined in relation to the media advance direction by a same inclination angle α comprised between 5 and 85 degrees. The first 221, respectively second 222, support wedge face the first 231, respectively second 232, movable arm wedge. In the example device 200, the spring 207A-B, in this case comprising a pair of springs, urges the first 221, respectively second 222, support wedge flush against the first 231, respectively second 232, movable arm wedge, during movement of the movable arm 205, in order to maintain the movable arm 205 parallel to the media advance direction 203 during movement of the movable arm 205. In some examples, the inclination angle α is an angle comprised between 5 and 40 degrees, between 10 and 35 degrees, between 15 and 30 degrees or between 15 and 25 degrees. In some examples, the wedges are integral with the support and the movable arm, respectively, thereby avoiding the use of transition pieces and increasing the reliability of the mechanical relationship between the support and the movable arm. The use of wedges permits maintaining a constant contact between the support and the movable arm during movement of the movable arm. In some examples, the wedges are metal machined wedges, permitting obtaining an increased precision and robustness.

In this example device 200, the spring is formed of a pair of springs, thereby improving the repartition of forces and the reliability of the mechanical relationship between the support and the movable arm. In this example, the springs are compression springs attached on one end to the support and on the other end to the movable arm, each spring pulling the movable arm towards the support. In this example, each spring is located in a spring chamber 208A-B within a body of the support 201, for example to avoid introducing protrusions in the movable arm 205, while portions of the movable arm pass through a portion of the support and into each spring chamber. Some of the reference numerals in FIGS. 2A-D are not repeated from Figure to Figure in order to maintain readability.

Figure 2A:
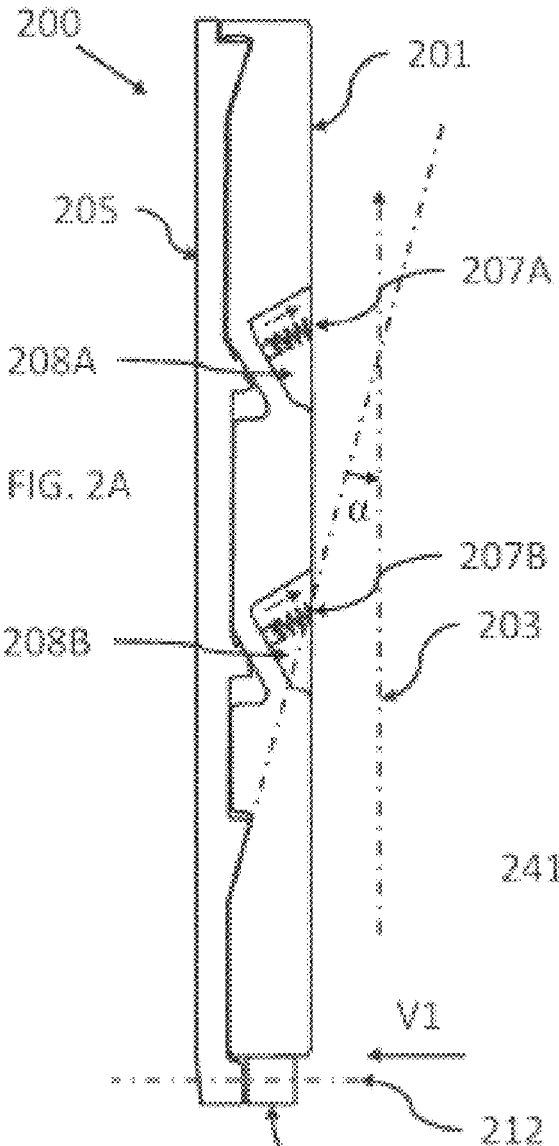
FIGS. 2A-D illustrate another example device for offsetting printing media in a printer input tray.
Figure 2B:
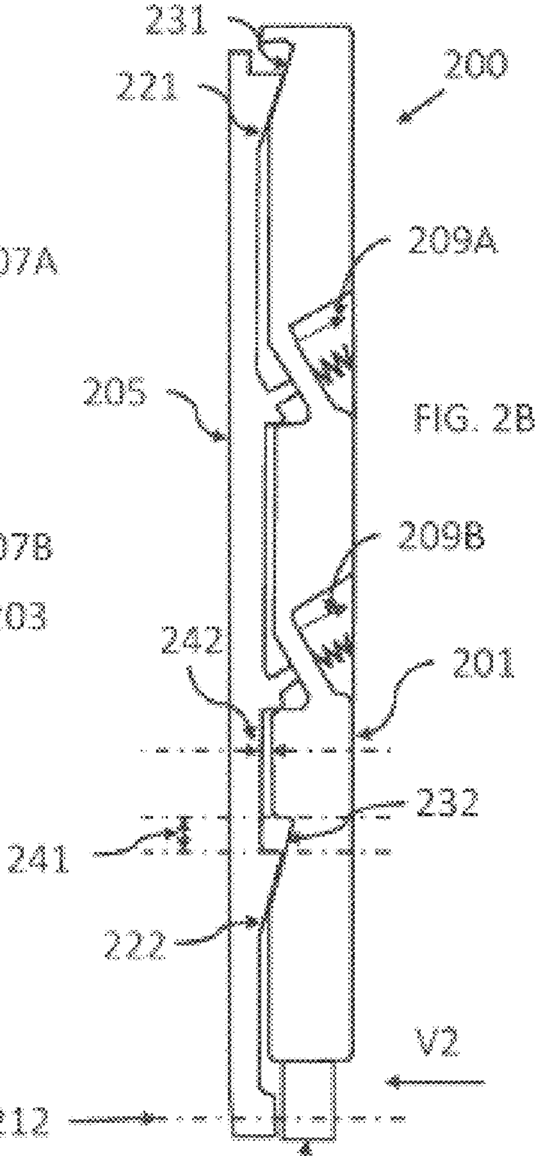
Figure 2C:
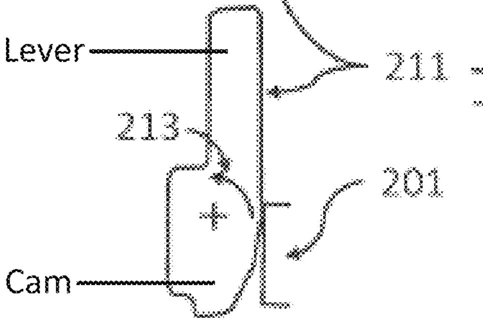
Figure 2D:
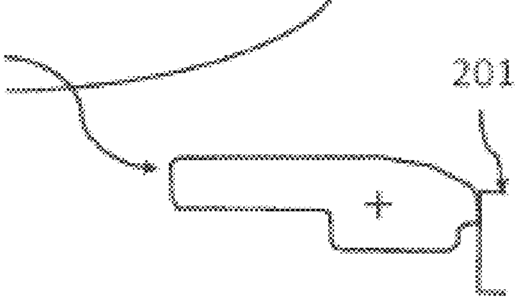

Example device 200 is illustrated in FIG. 2A with the actuator 211 being released, whereby the spring force is not compensated by the releasable actuator 211. FIG. 2C illustrates the position of the releasable actuator corresponding to FIG. 2A, viewed along view V1 of FIG. 2A. Example device 200 is illustrated in FIG. 2B with the actuator 211 compensating the spring force. FIG. 2D illustrates the position of the releasable actuator corresponding to FIG. 2B, viewed along view V2 of FIG. 2B. In this case, the releasable actuator comprises a lever movable between a released position (FIGS. 2A and 2C) and a latched position (FIGS. 2B and 2D), the spring force 209A-B pulling the lever from the latched position to the released position, the lever being movable from the released position to the latched position by hand against the spring force. In this specific example, as illustrated in FIGS. 2C and 2D, the lever comprises a cam, the lever being rotated as illustrated by arrow 213 in FIG. 2C to compensate the spring force and progressively moving the movable arm 205 away from the support 201 by compensating the spring force, until reaching the position illustrated in FIG. 2D, the support remaining static in relation to the input tray. In some examples, the rotation as illustrated by arrow: 213 is of about 90 degrees, in some examples of between 60 and 120 degrees. One should note that the cam may take a shape permitting reaching different and mechanically stable intermediate positions. Indeed, in some examples, the releasable actuator is movable between a released position and a plurality of other positions, each one of the other positions offsetting the movable arm away from the support by a respective offset distance. In this example, the lever rotates around a rotation axis 212 comprised in a plane parallel to the base of the input tray and perpendicular to the media advance direction. One should note that such a lever or other lever arrangement may be used in combination with mechanisms other than wedges.

As illustrated in the example of device 200, in some examples the movement of the movable arm is a translation in a plane parallel to the base of the input tray, the translation comprising a first component 241 along the media advance direction and a second component 242 along a direction perpendicular to the media advance direction, whereby a magnitude of the first component 241 exceeds a magnitude of the second component 242. Such a configuration, which may also be obtained in other examples, enables an increased mechanical control of the parallelism of the movable arm. In some examples, the magnitude of the first component is more than 1.5 times the magnitude of the second component, in some examples more than twice the magnitude of the second component, and in some examples more than thrice the magnitude of the second component. In some examples a maximum magnitude of the first component is of 10 mm, 7 m or 5 mm. In some examples, a maximum magnitude of the first component is of 3 mm, 2 m or 1.5 mm. In some examples, the parallelism of the movable arm is maintained along a length of the movable arm to a precision of less than 50 μm, of less than 30 μm, or of less than 20 μm along a direction perpendicular to the media advance direction. Precision is for example increased by increasing a ratio between the first and the second component, for example by reducing the angle α in the example of FIG. 2A.

Figure 3A:
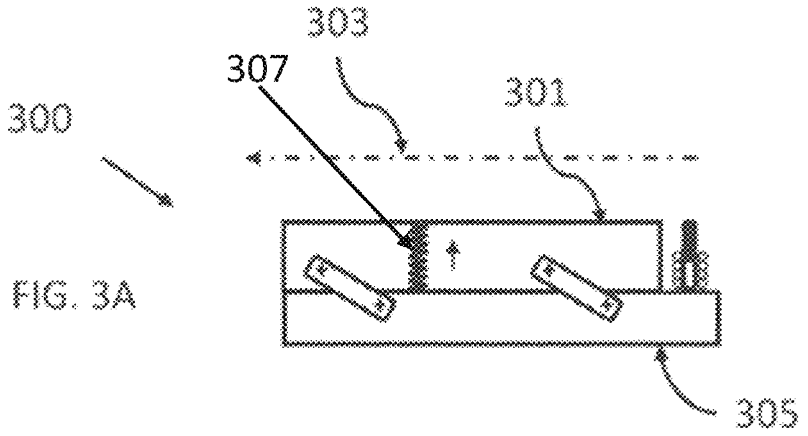
FIGS. 3A-C illustrate a further example device for offsetting printing media in a printer input tray.
Figure 3B:
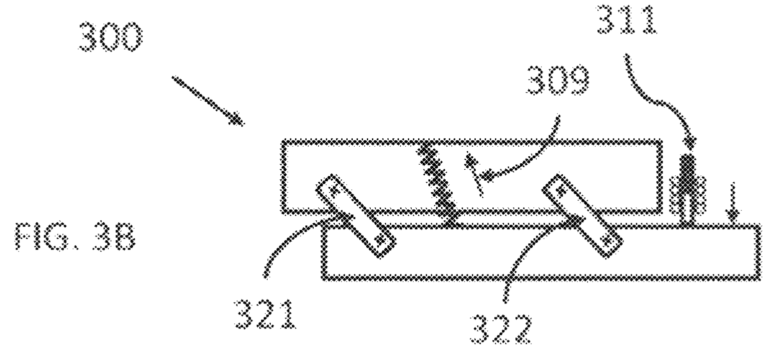
Figure 3C:
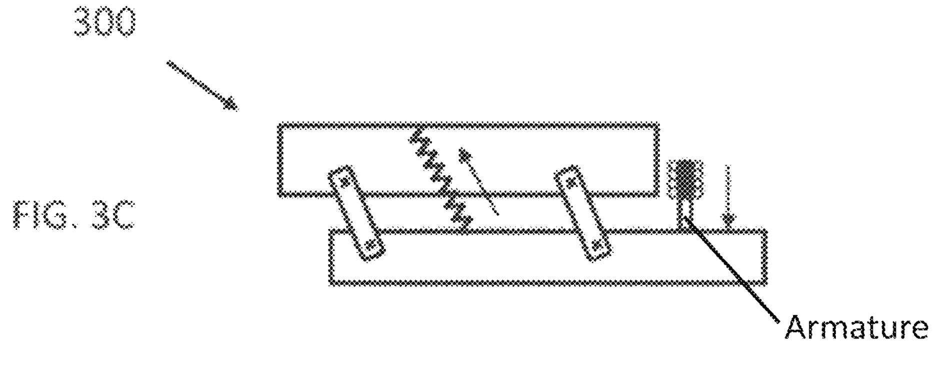

FIGS. 3A-C illustrate another example device 300 for offsetting printing media in a printer input tray, comprising:

- a support 301;
- a movable arm 305 extended along a media advance direction 303;
- a spring 307 for generating a spring force 309 urging the movable arm 305 against the support 301; and
- a releasable actuator 311 for compensating the spring force and for selectively offsetting the movable arm 305 away from the support 301 in a plane parallel to a base of the input tray, whereby the movable arm 305 is maintained parallel to the media advance direction 303 during movement of the movable arm 305.

Device 300 further comprises a set of linked arms 321 and 322 connecting the support to the movable arm, each linked arm being connected by a respective pair of pivots to both the support and the movable arm, the pivots permitting rotation of the linked arms around a rotation axis substantially normal to the base of the input tray, the pivots of each pair being separated by a same distance from each other in order to maintain the movable arm parallel to the media advance direction during movement of the movable arm. Such an arrangement permits maintaining parallelism of the movable arm, and could be used in other examples. As illustrated, the movable arm may be progressively moved away from the support from FIG. 3A to FIG. 3B, and from FIG. 3B to FIG. 3C, similarly to the movable arm 105 illustrated in Figures IA-C.

In the example of device 300, the releasable actuator comprises a solenoid 311, the solenoid comprising an armature movable between a released position (FIG. 3A) and an energized position and back, the spring force 309 pulling the armature from the energized, or latched, position (FIG. 3C) back to the released position (FIG. 3A), the armature being movable against the spring force from the released position to the energized position by energizing of the solenoid. This example configuration permits automating the device according to this disclosure and may be used in other examples. In some examples, the releasable actuator comprises a servo regulated electric motor.

Figure 4A:
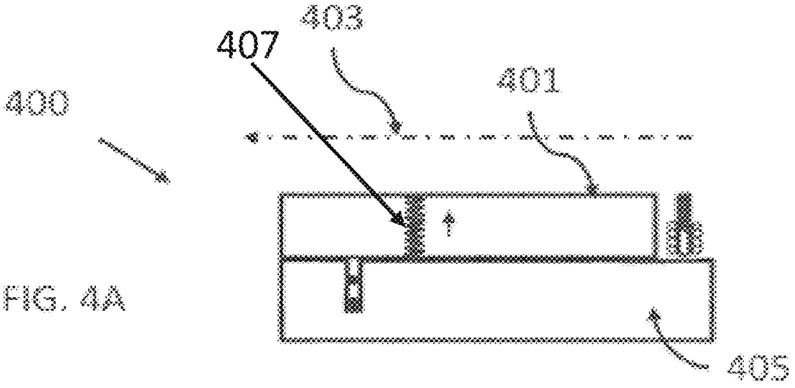
FIGS. 4A-C illustrate yet another example device for offsetting printing media in a printer input tray.
Figure 4B:
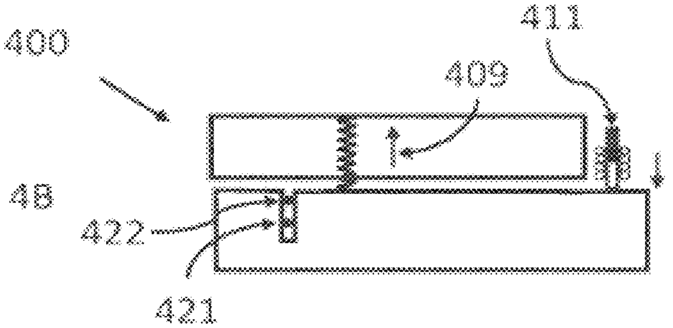
Figure 4C:
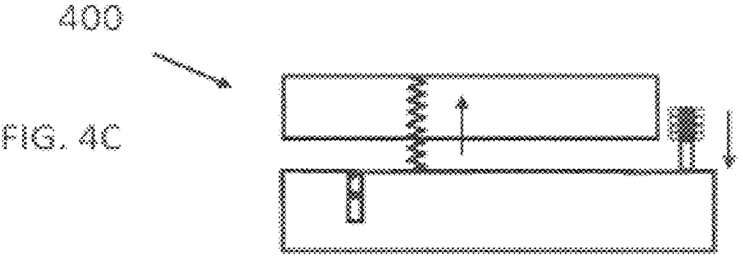

FIGS. 4A-C illustrate another example device 400 for offsetting printing media in a printer input tray, comprising:

- a support 401;
- a movable arm 405 extended along a media advance direction 403;
- a spring 407 for generating a spring force 409 urging the movable arm 405 against the support 401; and
- a releasable actuator 411 for compensating the spring force and for selectively offsetting the movable arm 405 away from the support 401 in a plane parallel to a base of the input tray, whereby the movable arm 405 is maintained parallel to the media advance direction 403 during movement of the movable arm 405.

Device 400 further comprises a set of alignment pins 421 and 422 in order to maintain the movable arm parallel to the media advance direction during movement of the movable arm. In this example, the alignment pins are static in relation to the support 401, the device 400 comprising a guiding groove in which the pins 421 and 422 are inserted in order to maintain parallelism.

Such an arrangement permits maintaining parallelism of the movable arm, and could be used in other examples. As illustrated, the movable arm may be progressively moved away from the support from FIG. 4A to FIG. 4B, and from FIG. 4B to FIG. 4C, similarly to the movable arm 105 illustrated in Figures IA-C or to the movable arm 305 illustrated in FIGS. 3A-C. In this example, the releasable actuator is a solenoid similar to solenoid 311 illustrated in FIGS. 3A-3C.

Figure 4D:
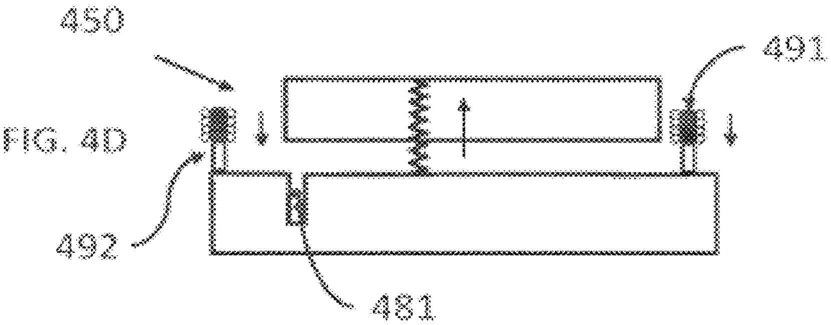
FIG. 4D illustrates yet a further example device for offsetting printing media in a printer input tray.

Yet a further example device 450 is illustrated in FIG. 4D. In this example, similar to the example 400 illustrated in FIGS. 4A-C, a single pin 481 and matching grove and a set of solenoids 491 and 492 are provided, the combination of solenoids permitting compensating the spring force, the solenoids being operated by a controller to maintain the movable arm parallel to the media advance direction in combination with the pin and grove mechanism.

Figure 5:
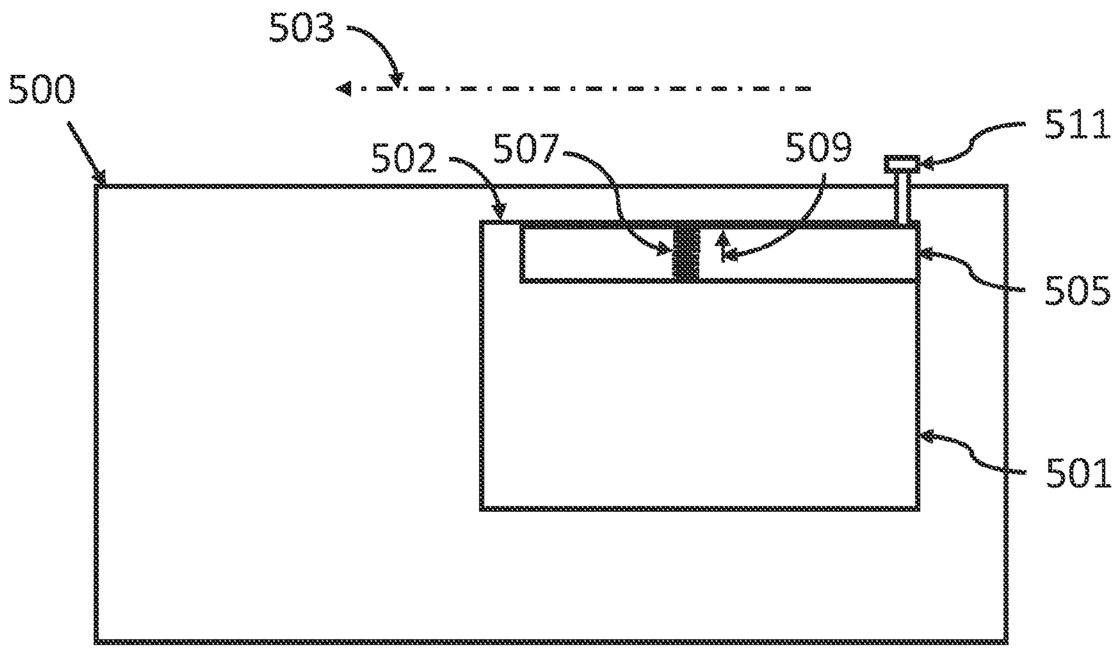
FIG. 5 illustrates an example printer.

FIG. 5 illustrates an example printer 500. Example printer 500 may for example be a thermal inkjet printer, a piezo inkjet printer, a laser printer or a liquid electrostatic fluid printer. The printer may comprise a scanning print head or a static printhead. The example printer 500 comprises an input tray 501 for printing media. An input tray should be understood as a generally planar mechanical element on which printing media, for example in a sheet form, may be placed prior to being processed in a print zone of a printer. In some examples the input tray comprises a base and input tray sides extending from the base, the input tray having for example a drawer like shape. The printer 500 also comprises a movable arm 505 located along a side 502 of the input tray 501 along a media advance direction 503. The printer 500 further comprises a spring 507 for generating a spring force 509 pressing the movable arm 505 against the side 502 of the input tray 501. In some examples the movable arm is pressed directly against the side 502 of the input tray 501 by the spring force. In other examples, the movable arm is pressed indirectly against the side 502 of the input tray 501 by the spring force, the movable arm being separated from the input tray side by a spacer or a transition piece. The input tray side, spacer or transition piece may operate as the support described in the context of example devices 100, 200, 300 or 400. The printer 500 comprise a releasable actuator 511 for overcoming the spring force 509 and for shifting the movable arm 505 away from the side 502 of the input tray 501, whereby the movable arm 505 remains parallel to the media advance direction 503 during shifting of the movable arm 505. As explained in the context of devices 100, 200, 300, 400 and 500, such a configuration permits processing printing media along the media advance direction by placing the printing media along the movable arm shifted away from the side of the input tray while reducing a risk of skew due to retracting the movable arm back against the side of the input tray once the printing media has been aligned with the media advance direction.

Figure 6:
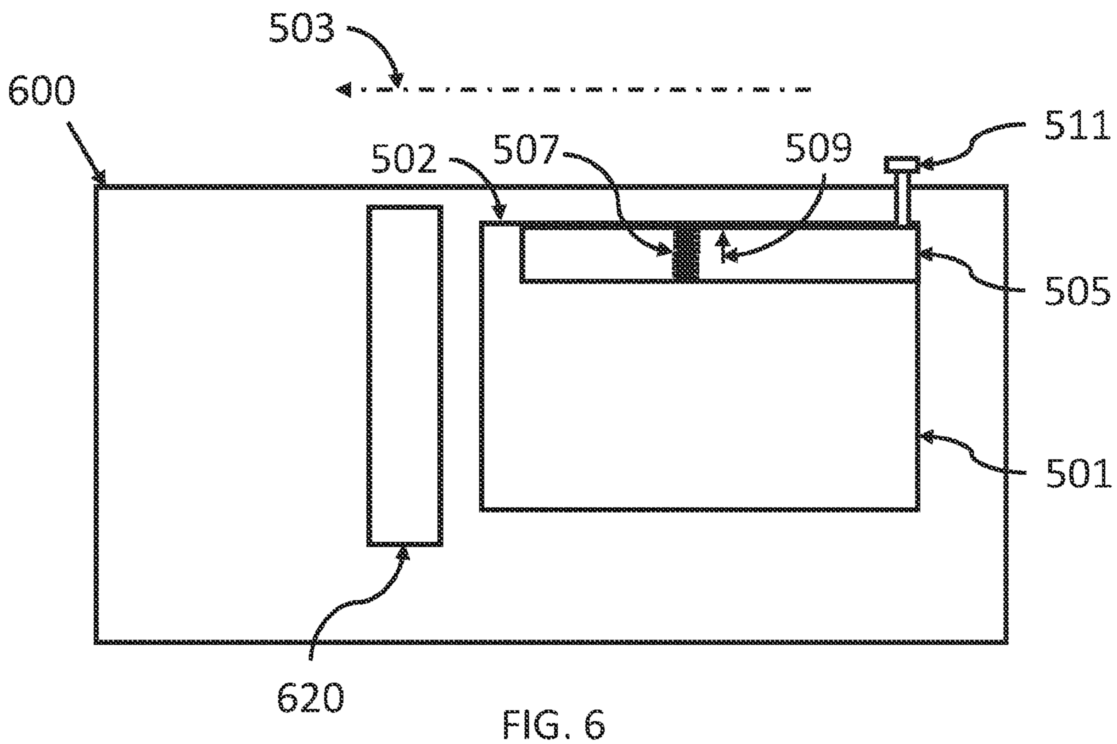
FIG. 6 illustrates another example printer.

FIG. 6 illustrates an example printer 600. Example printer 600 comprises the components described in the context of FIG. 5, the components being numbered using the same reference numerals. Printer 600 further comprises a page wide array 620 of nozzles. A page wide array of nozzles permits printing across a width of a printing media. While the width of the printing media is perpendicular to the media advance direction, the page wide array may be at different angles to the media advance direction. The page wide array remains static during printing, and using a page wide array can permit printing faster than, for example, a scanning printhead which would move across the width of a printing media. A printhead, such printhead being a page wide array print head or a scanning printhead, may comprise hundreds or thousands of nozzles, which may not all be operational, some of the nozzles being, for example, clogged. In case of a non-operational nozzle in a scanning printhead, another nozzle may be used as a back-up nozzle to compensate for the non-operational nozzle, the back-up nozzle being moved by the scanning printhead to a position permitting it to replace the non-operational nozzle. In some examples, such replacement of a non-operational nozzle by a backup nozzle in a scanning printhead configuration takes place during a so called “multi-pass” print mode, whereby the scanning printhead flies over a specific area of the printing media multiple times, thereby permitting such nozzle replacement. Such compensation of a non-operational nozzle by a back-up nozzle is however not applicable to a page wide array’s configuration, due to the fact that such page wide arrays are static. Such lack of compensation of a non-operational nozzle can introduce a printing defect, for example introducing an unprinted line along the media advance direction. It was found that the movable arm according to this disclosure permitted resolving such a defect by enabling a page wide array multi pass mode whereby the printing media is, in a first pass, placed along the movable arm in a first position (for example against the side of the input tray), and, in a second pass, placed along the movable arm in a second position different from the first position (for example shifted away from the side of the input tray). Such displacement between passes along a direction perpendicular to the media advance direction, the printing media remaining aligned with the media advance direction, permits that a specific area of the printing media would face different nozzles in different passes, thereby permitting operating a multi-pass mode using back-up nozzles. In some examples, adjacent nozzles of the page wide array of nozzles are separated from each other along a direction substantially perpendicular to the media advance direction by a nozzle separation distance, whereby the releasable actuator enables a movement of the movable arm of at least the nozzle separation distance along the direction substantially perpendicular to the media advance direction. Such a configuration enables nozzle replacement by offsetting the printing media in a direction perpendicular to the media advance direction by a distance permitting replacing a non-operational nozzle by a back-up nozzle adjacent to the non-operational nozzle. Such a nozzle separation distance may for example be of more than 10 μm, of more than 20 μm, or of more than 50 μm.

Figure 7:
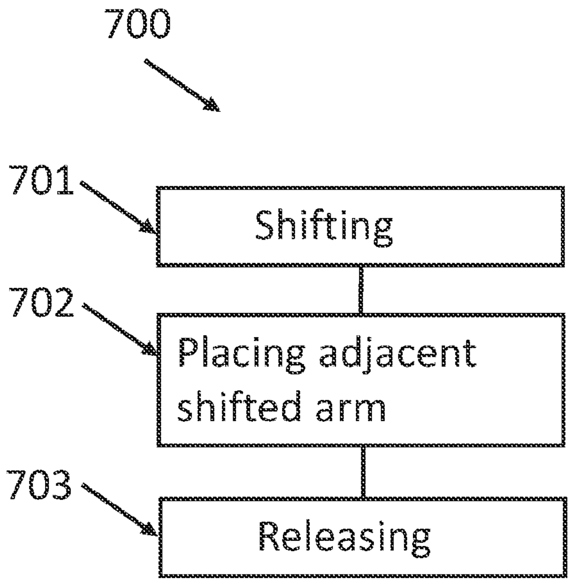
FIG. 7 illustrates an example method.

FIG. 7 illustrates an example method 700 which may be used to operate a device or a printer as described in the present disclosure. Method 700 comprises, in block 701, shifting a movable arm away from a side of an input tray of a printer by overcoming a spring force using a releasable actuator, whereby the movable arm is located along the side of the input tray along a media advance direction, whereby the spring force is generated by a spring directing the movable arm against the side of the input tray, and whereby the movable arm remains parallel to the media advance direction during the shifting of the movable arm. The shifting of the movable arm will offset the movable arm away from the side of the input tray.

Example method 700 also comprises, in block 702, placing a printing medium on a base of the input tray and adjacent to the shifted movable arm. It should be noted that block 702 may take place, in time, prior to block 701, or following block 701. In some examples, the shifting according to block 701 will align with the media advance direction a printing medium already placed according to block 702 in the input tray, as illustrated for example in FIGS. 1A-C. In other examples, the shifting according to block 701 may take place prior to placing a printing medium as per block 702, the shifting taking place for example with an empty input tray, the printing medium being thereafter placed along the shifted movable arm by an operator.

Example method 700 further comprises, in block 703, releasing the releasable actuator such that the movable arm returns against the side of the input tray. Releasing as per block 703 may take place prior to or following any one of blocks 701 or 702. Any one of blocks 701, 702 or 703 may be repeated a different number of times. In some examples, the movable arm is released as per block 703, such release being directly followed by placing a printing medium as per block 702, such placing being directly followed by shifting according to block 701 to align the printing medium with the media advance direction, such shifting being directly followed by releasing according to block 703 to move the movable arm out of the way of the printing medium and avoid skewing.

In some examples, the printing medium is a rigid printing medium. A rigid printing medium should be understood as a printing medium which does not change shape under the force of its own weight. In some examples, rigid printing medium have relatively uneven sides perpendicular to a leading edge of such printing medium, such rigid printing medium being thereby relatively more prone to skewing. In such examples, use of a mobile arm as per the example methods hereby described permits avoiding or reducing such risk of skew while aligning such rigid printing medium along the media advance direction appropriately. It should also be noted that rigid medium may in some cases be relatively heavy and difficult to manipulate, in which case the movable arm may ease the positioning of such rigid medium.

Figure 8:
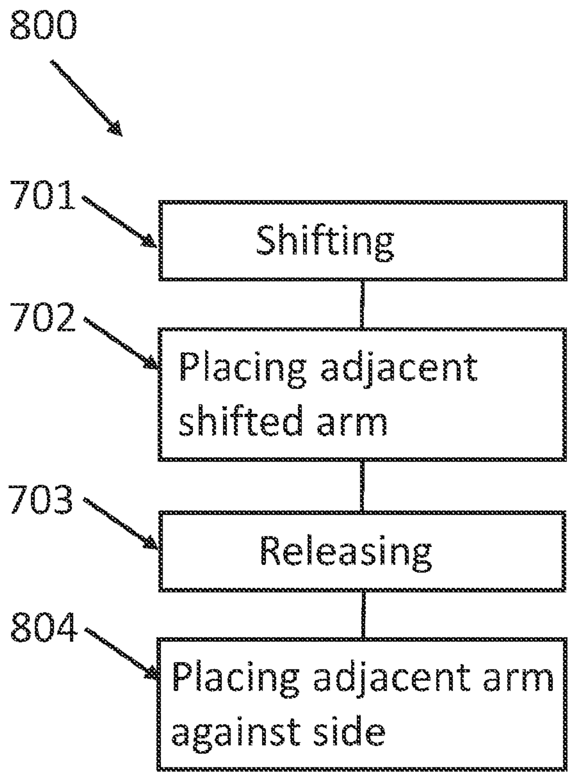
FIG. 8 illustrates another example method.

FIG. 8 illustrates another example method 800. Example method 800 comprises blocks 701, 702 and 703 as described in the context of example method 700. Example method 800 further comprises block 804 of placing the printing medium on the base of the input tray and adjacent the movable arm, the movable arm being against the side of the input tray Example method 800 is applied to a printer being a page wide array printer. Example method 800 for example permits operating a page wide array in a multi pass mode, whereby a same printing medium may be processed by the printer after being placed adjacent the movable arm being against the side of the input tray in one pass and after being placed adjacent the shifter movable arm in another pass, or in the reverse order, the printing media being in such different passes placed along the media advance direction, the printing media being offset in one pass compared to the other, thereby enabling use of back up nozzles in case of non-operational nozzles.

What is claimed is:

1. A device for offsetting printing media in a printer input tray, comprising:

a support;

a movable arm extended along a media advance direction;

a spring for generating a spring force urging the movable arm directly against the support; and a releasable actuator for compensating the spring force and for selectively offsetting the movable arm away from the support in a plane parallel to a base of the input tray, whereby the movable arm is maintained parallel to the media advance direction during movement of the movable arm.

2. The device according to claim 1, whereby:

the support comprises a first and a second support wedge;

the movable arm comprises a first and a second movable arm wedge;

whereby the wedges are comprised in planes substantially perpendicular to the base of the input tray and inclined in relation to the media advance direction by a same inclination angle comprised between 5 and 85 degrees, the first, respectively second, support wedge facing the first, respectively second, movable arm wedge; and whereby the spring urges the first, respectively second, support wedge flush against the first, respectively second, movable arm wedge, during movement of the movable arm, in order to maintain the movable arm parallel to the media advance direction during movement of the movable arm.

3. The device according to claim 1, the device further comprising a set of linked arms connecting the support to the movable arm, each linked arm being connected by a respective pair of pivots to both the support and the movable arm, the pivots permitting rotation of the linked arms around a rotation axis substantially normal to the base of the input tray, the pivots of each pair being separated by a same distance from each other, in order to maintain the movable arm parallel to the media advance direction during movement of the movable arm.

4. The device according to claim 1, the device comprising an alignment pin in order to maintain the movable arm parallel to the media advance direction during movement of the movable arm.

5. The device according to claim 1, whereby the movement of the movable arm is a translation in a plane parallel to the base of the input tray, the translation comprising a first component along the media advance direction and a second component along a direction perpendicular to the media advance direction, whereby a magnitude of the first component exceeds a magnitude of the second component.

6. The device according to claim 1, the releasable actuator comprising a lever movable between a released position and a latched position, the spring force pulling the lever from the latched position to the released position, the lever being movable from the released position to the latched position by hand against the spring force.

7. The device according to claim 6, whereby the lever comprises a cam.

8. The device according to claim 1, the releasable actuator comprising a solenoid, the solenoid comprising an armature movable between a released position and an energized position and back, the spring force pulling the armature from the latched position to the released position, the armature being movable against the spring force from the released position to the energized position by energizing of the solenoid.

9. The device according to claim 1, whereby the releasable actuator is movable between a released position and a plurality of other positions, each one of the other positions offsetting the movable arm away from the support by a respective offset distance.

10. A printer comprising:

an input tray for printing media;

a movable arm located along a side of the input tray along a media advance direction;

a spring for generating a spring force pressing the movable arm directly against the side of the input tray; and a releasable actuator for overcoming the spring force and for shifting the movable arm away from the side of the input tray, whereby the movable arm remains parallel to the media advance direction during shifting of the movable arm.

11. The printer according to claim 10, whereby the printer comprises a page wide array of nozzles.

12. The printer according to claim 11, whereby adjacent nozzles of the page wide array of nozzles are separated from each other along a direction substantially perpendicular to the media advance direction by a nozzle separation distance, whereby the releasable actuator enables a movement of the movable arm of at least the nozzle separation distance along the direction substantially perpendicular to the media advance direction.

13. A method comprising:

shifting a movable arm away from a side of an input tray of a printer by overcoming a spring force using a releasable actuator, whereby the movable arm is located along the side of the input tray along a media advance direction, whereby the spring force is generated by a spring directing the movable arm directly against the side of the input tray, and whereby the movable arm remains parallel to the media advance direction during the shifting of the movable arm;

placing a printing medium on a base of the input tray and adjacent to the shifted movable arm; and releasing the releasable actuator such that the movable arm returns directly against the side of the input tray.

14. The method according to claim 13, whereby the printing medium is a rigid printing medium.

15. The method according to claim 13, whereby the printer is a page wide array printer, the method further comprising: placing the printing medium on the base of the input tray and adjacent the movable arm, the movable arm being against the side of the input tray.

* * * * *